(12) United States Patent
Watanabe et al.

(10) Patent No.: US 6,330,836 B1
(45) Date of Patent: Dec. 18, 2001

(54) STEEL FOR GEAR DRIVE PLATE GEAR AND METHOD FOR PRODUCING THE DRIVE PLATE GEAR

(75) Inventors: Hiroshi Watanabe; Masakiyo Ohya; Masato Shibata, all of Kosai (JP)

(73) Assignee: Fujikiko Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/539,111

(22) Filed: Mar. 30, 2000

(30) Foreign Application Priority Data

Mar. 30, 1999 (JP) .................................... 11-089918

(51) Int. Cl.[7] ............................ F16H 55/06; C22C 38/00; B23P 15/14
(52) U.S. Cl. .................... 74/434; 29/893.32; 29/893.34; 29/893.37; 148/586; 420/8
(58) Field of Search .................. 74/431, 434; 29/893.32, 29/893.34, 893.37; 148/586; 420/8

(56) References Cited

U.S. PATENT DOCUMENTS

| | | | |
|---|---|---|---|
| 4,946,645 | * 8/1990 | Namiki et al. | 420/84 |
| 5,310,432 | * 5/1994 | Fukui et al. | 148/330 |
| 6,093,263 | * 7/2000 | Kobayashi et al. | 148/318 |
| 6,161,409 | * 12/2000 | Friese | 72/110 |

FOREIGN PATENT DOCUMENTS

| | | |
|---|---|---|
| 59-74262 | * 4/1984 | (JP) . |
| 02066137 | 6/1990 | (JP) . |
| 4-37432 | 2/1992 | (JP) . |
| 08092634 | 9/1996 | (JP) . |
| 09241799 | 9/1997 | (JP) . |

OTHER PUBLICATIONS

C:W: WEGST: Stahlschlussel, 1986, pp. 1–28, 158, 162, Verlag Stahlschlussel Wegst GmbH, Marbach, DE XP002140220.

* cited by examiner

Primary Examiner—Allan D. Herrmann
(74) Attorney, Agent, or Firm—Kilpatrick Stockton LLP

(57) ABSTRACT

A steel for a gear which is formed on a drive plate gear includes; C: 0.32 to 0.38%, Si: 0.1% or less, Mn: 0.60 to 0.90%, P: 0.03% or less, and S: 0.035% or less.

5 Claims, 15 Drawing Sheets

STEEL FOR GEAR DRIVE PLATE GEAR AND METHOD FOR PRODUCING THE DRIVE PLATE GEAR

BACKGROUND OF THE INVENTION

1. Field of the Invention

The present invention relates to steel for a gear that is the best suited for molding cogs by component rolling, a gear that is made of the steel for the gear and is a drive plate gear used in starting of an engine, and a method for producing the gear.

2. Description of the Related Art

As steel for a gear of this type, there is S35C material defined in the Japanese Industrial Standard (JIS), for example. The S35C material includes C: 0.32 to 0.38%, Si: 0.15 to 0.35, Mn: 0.60 to 0.90%, P: 0.03% or less, S: 0.035% or less, and the balance of Fe and unavoidable impurity, by weight.

The drive plate gear transmits rotation of an engine to a transmission side and transmits rotation of a starter motor to the engine by a gear provided to an outer periphery of the drive plate gear.

Such a drive plate gear is usually produced by cold working by using the above S35C material. In other words, in producing the drive plate gear, a thick portion is molded on an outer periphery portion of the S35C material provided in a shape of a disc, and then, the gear is molded on an outer periphery of the thick portion by component rolling.

However, because hardness increases in molding the thick portion when the above S35C material is used, end portions of a cog (end portions in a width direction of the cog) are likely to crack in molding the gear. There is also a disadvantage of extremely short life of a gear-molding tool because of high hardness of the thick portion.

SUMMARY OF THE INVENTION

The present invention has been accomplished with the above circumstances in view and it is an object of the invention to provide steel for a gear, a drive plate gear, and a process for producing the drive plate gear for preventing cracking of end portions of a cog in molding a gear and for increasing life of the gear molding tool.

To achieve the above object, an invention according to a first aspect is steel for a gear formed of steel comprising C: 0.32 to 0.38%, Si: 0.1% or less, Mn: 0.60 to 0.90%, P:
    0.03% or less, and S: 0.035% or less.

In the invention according to the first aspect with the above structure, percentages of the respective components are based on weight and the balance includes Fe (iron) and unavoidable impurity. The components other than Si correspond to S35C material In JIS. By setting Si at 0.1% or less, increase in hardness of the thick portion is smaller and elongation is improved as compared with the S35C material when cold working for increasing a thickness of the disc-shaped peripheral edge portion in an axial direction is applied. Therefore, it is possible to prevent cracking of end portions of the cog in molding the gear on the thick portion and to increase life of a gear molding tool. Moreover, by setting Si at 0.1% or less, a yield point rises to improve durability of the disc.

An invention according to a second aspect is a drive plate gear molded of the steel for the gear according to the first aspect, comprising: an arm (1); a rim (2) formed in an annular shape on an outer periphery portion of then arm (1), the rim (2) having a predetermined thickness in an axial direction; and a plurality of cogs (3) molded on an outer peripheral surface of the rim (2) by component rolling, wherein the rim (2) is retained by a molding support die (6) which has an inner periphery support surface (61a) for supporting an inner peripheral surface of the rim (2) and which includes resistance means for providing resistance to a flow of the rim (2) in the component rolling; and the cogs (3) are molded on the rim(2) by the component rolling from an outer peripheral surface side while the rim (2) is retained by the molding support die (6).

In the invention according to the second aspect, because the cogs (3) are formed by component rolling on the outer peripheral surface of the rim (2) while supporting the inner peripheral surface of the rim (2) by the inner periphery support surface (61a) and the resistance means for providing resistance to the flow of the rim (2) in the component rolling is provided to the inner periphery support surface (61a), it is possible to suppress escaping of the rim pressed in the component rolling to end surface sides of the rim (2). Therefore, the rim (2) escapes only slightly in the component rolling, and thus, the accurate cogs (3) can be molded by component rolling without providing much extra material to the rim (2).

Although the resistance means suppresses the flow of the rim (2) in component rolling, the resistance means does not forcibly and firmly restrain the flow of the rim (2). Therefore, it is possible to suppress or reduce hardening and residual stress of material generated in the rim (2). Thus, molding cracking of bottom portions of the cogs (3) molded by component rolling can be prevented and accuracy of the cogs (3) can be improved.

Furthermore, by using the steel for the gear including the components of the present application, it is possible to improve durability of the arm (1) (a plate portion between the rim and the through holes (11), (12) for connection with the crankshaft side).

An invention according to a third aspect is a method for producing a drive plate gear molded of the steel for the gear according to the first aspect, comprising the step of: molding a plurality of cogs (3) by component rolling on an outer peripheral surface of a rim (2) which is formed in an annular shape on an outer periphery portion of an arm (1) and which has a predetermined thickness in an axial direction, wherein while the rim (2) is retained from an inner peripheral surface (61a) side by a molding support die (6) which has an inner periphery support surface (61a) for supporting an inner peripheral surface of the rim (2) and which includes resistance means for providing resistance to a flow of the rim (2) in the component rolling, the cogs (3) are molded on the outer peripheral surface of the rim (2) by the component rolling.

The invention according to the third aspect exhibits similar operations to the invention according to the second aspect.

Moreover, because the rim (2) is not restrained in a recessed manner in a restraining recessed portion, it is possible to maintain a large gap between a tool for component rolling and the inner periphery support surface (61a) of the molding support die (6). Therefore, even when the material escapes to an end surface side in component rolling, the material is retained between the molding tool, for example, for component rolling and the molding support die (6), and therefore, force (F) for pushing the molding tool against the rim (2) does not increase. Thus, life of a component rolling tool such as the molding support die (6) can be increased.

Furthermore, because increase in hardness is small and elongation is improved in the steel for the gear including the components of the present application, it is possible to prevent cracking of end portions of the cog in molding the gear on the thick portion and to increase life of the gear molding tool.

An invention according to a fourth aspect is a drive plate gear molded of the steel for the gear according to the first aspect, comprising: a disc (111); amounting portion (111a) for mounting the drive plate gear to a crankshaft (120) of an engine at a center portion of the disc (111); a mounting portion (111d) for mounting the drive plate gear to a torque converter (140) at an outer periphery portion of the disc (111); and a cylindrical portion (112) formed with cogs (113) and provide on an outer peripheral edge of the disc (111), wherein an intermediate portion between the cylindrical portion (112) and the mounting portion (111a) for mounting the drive plate gear to the crankshaft (120) is formed to be thin so as to absorb vibration of the torque converter (140) mounted to the drive plate gear and has flexibility; the cylindrical portion (112) is formed to be thick by increasing thicknesses of opposite end portions of the outer peripheral edge of the disc (111) made of the steel for the gear; and the cogs (113) are formed by component rolling on an outer peripheral surface of the thick cylindrical portion (112).

In the invention according to the fourth aspect, the drive plate gear has flexibility because the intermediate portion between the thick cylindrical portion (112) and the mounting portion (111a) is formed to be thin so as to absorb vibration of the torque converter (140) mounted to the drive plate gear.

The cogs (113) are integrally formed on the outer peripheral surface of the cylindrical portion (112) formed to be thick by increasing thicknesses of the opposite end portions of the outer periphery portion. Therefore, strength of the cogs (113) is ensured while reducing the thickness so as not to reduce flexibility. As a result, it is possible to sufficiently absorb vibration of the torque converter (140) to prevent transmission of the vibration to the engine side and to reduce weight.

Furthermore, by using the steel for the gear including the components of the present application, it is possible to improve durability of the plate portion between the thick cylindrical portion and the through holes (111c), (111b) for connection with the crankshaft side.

An invention according to a fifth aspect is a method for producing a drive plate gear from a thin disc-shaped material made of the steel for the gear according to the first aspect, comprising the steps of: plastically processing to form a cylindrical portion (112) having the same axis as a disc portion at an outer peripheral edge portion of the disc portion: and molding cogs (113) by component rolling on an outer peripheral surface of the cylindrical portion (112), wherein a roller rotating synchronously with the disc-shaped material is pushed radially inward against an outer peripheral surface of the disc-shaped material to increase thicknesses of opposite end portions of an outer periphery portion of the disc-shaped material to form the thick cylindrical portion (112); and the cogs (113) are molded by the component rolling on the outer peripheral surface of the cylindrical portion (112) after forming the thick cylindrical portion (112).

In the invention according to the fifth aspect, in molding the above drive plate gear, the roller rotating synchronously with the disc-shaped material is pushed radially inward against the outer peripheral surface of the disc-shaped material to increase the thicknesses of the opposite end portions of the outer periphery portion of the disc-shaped material to form the thick cylindrical portion (112), and then, the cogs (113) are molded by component rolling on the outer peripheral surface of the cylindrical portion (112). Therefore, it is possible to easily mold the cogs (113) with necessary strength on the outer periphery of the thin disc made of the steel for the gear, to improve the strength of the cogs (113), and to easily produce the drive plate gear which has flexibility and in which vibration of the torque converter (140) is prevented from being transmitted to the engine. Because a securing step such as welding that has been conducted conventionally is unnecessary, it is possible to significantly reduce producing cost.

Because increase in hardness is small and elongation is improved in the steel for the gear including the components of the present application, it is possible to prevent cracking of end portions of the cog in molding the gear on the thick portion and to increase life of the gear molding tool.

DESCRIPTION OF THE PREFERRED EMBODIMENTS

Figure 4:
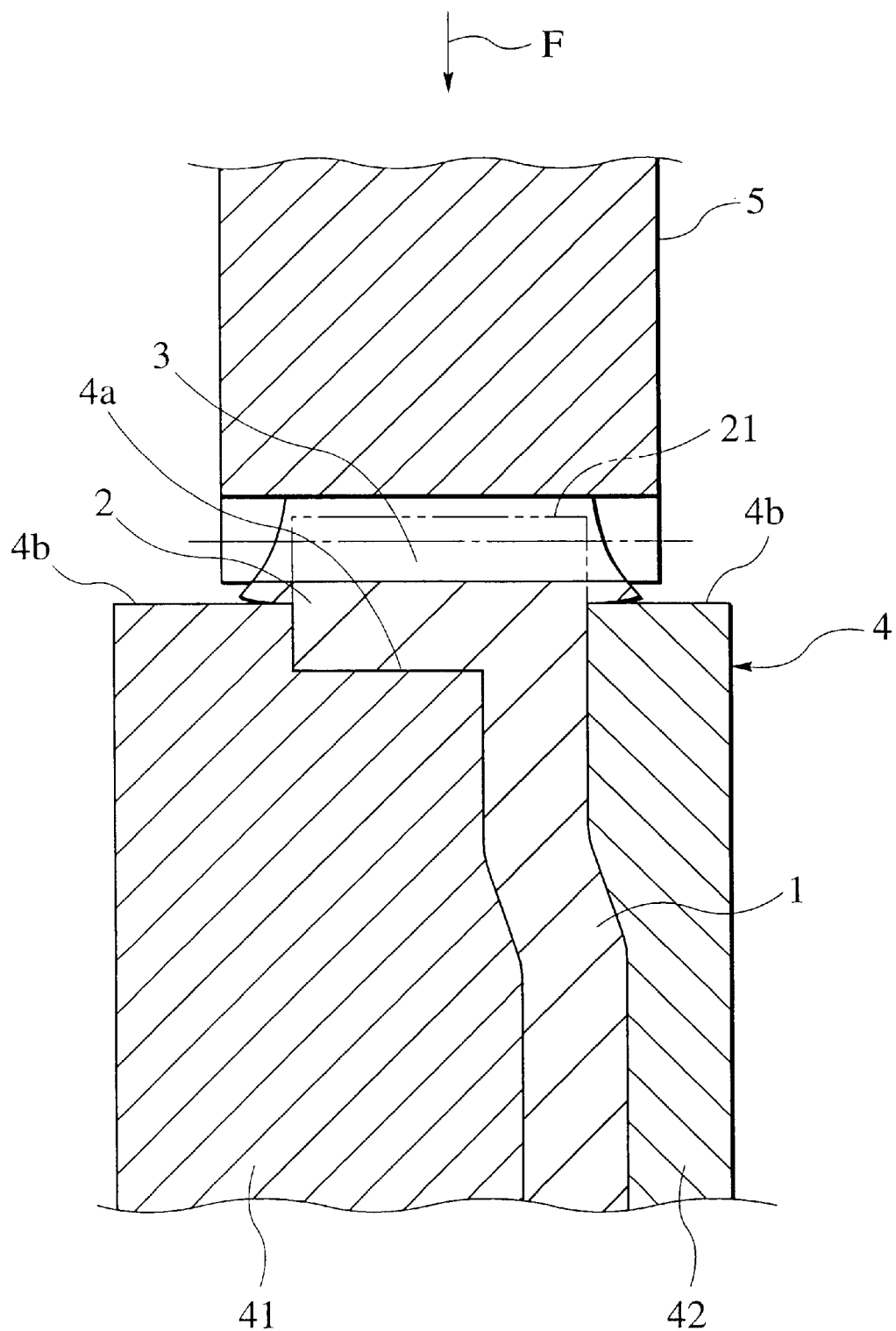
FIG. 4 is a sectional view of an essential portion showing disadvantages of a conventional drive plate gear and a process for producing the gear as compared with the above drive plate gear and the process for producing the gear.
Figure 5:
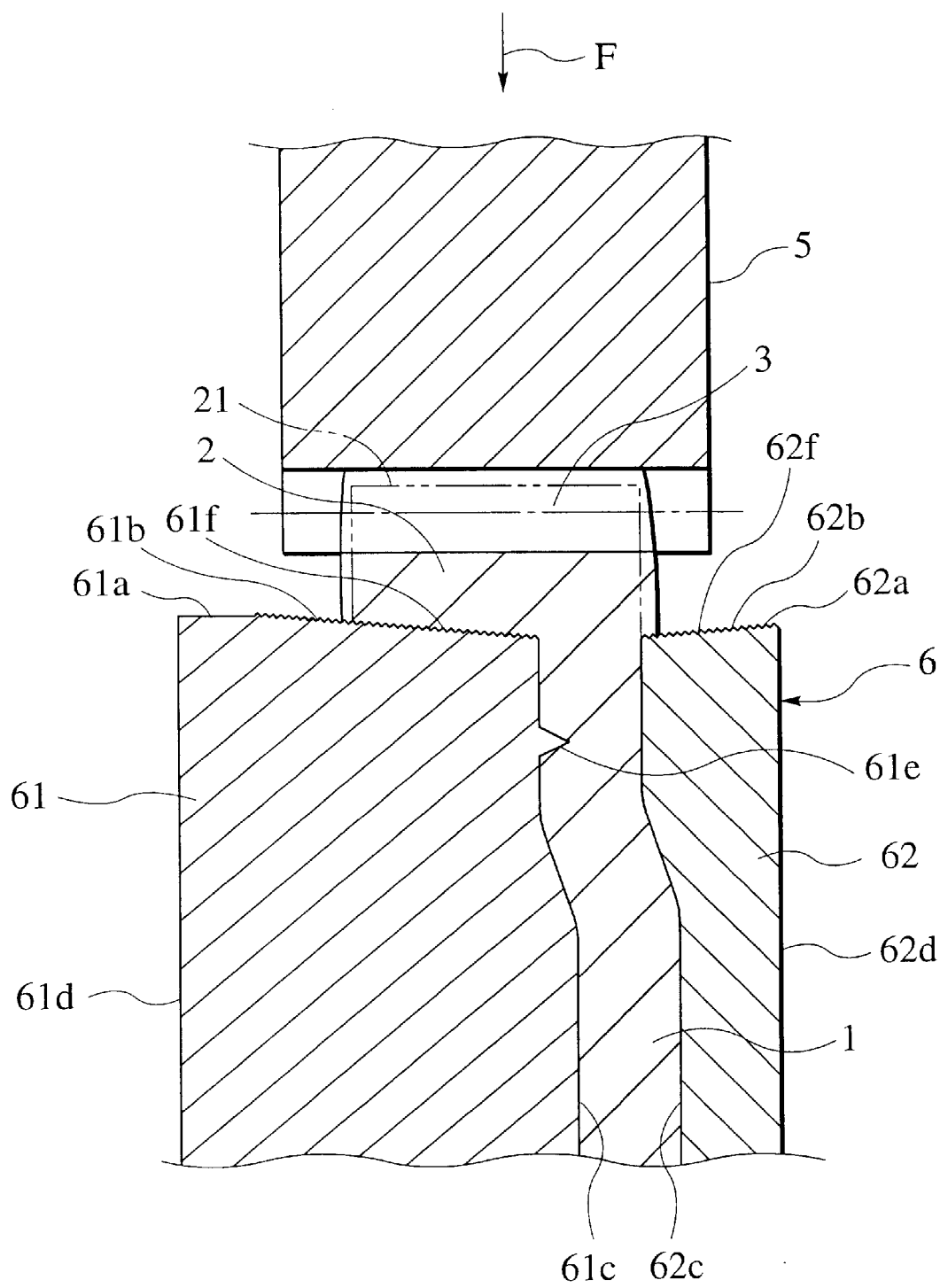
FIG. 5 is a sectional view of an essential portion of a drive plate gear and a process for producing the gear as a second embodiment of the invention.
Figure 6:
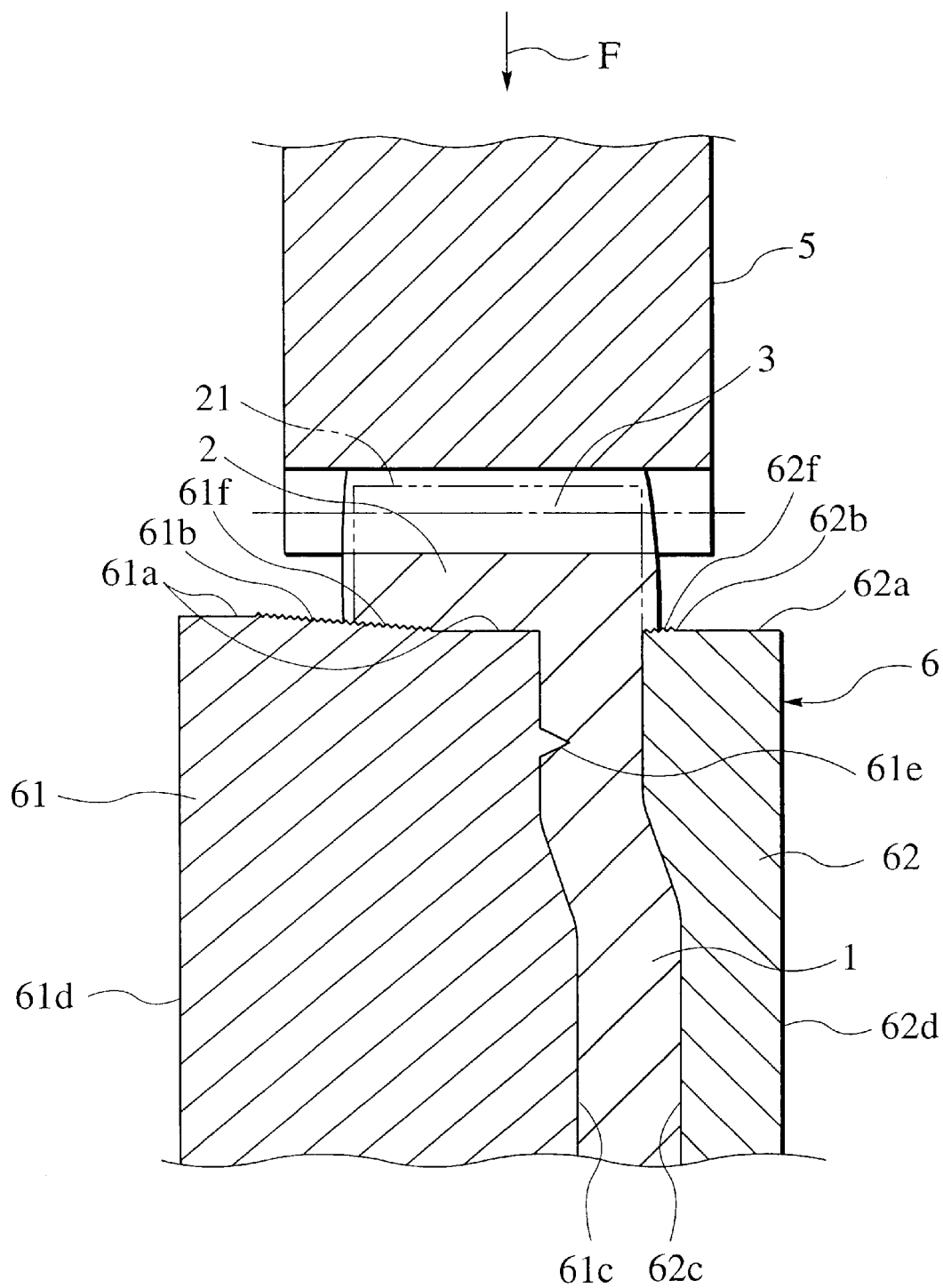
FIG. 6 is a sectional view of an essential portion of a drive plate gear and a process for producing the gear as a third embodiment of the invention.
Figure 7:
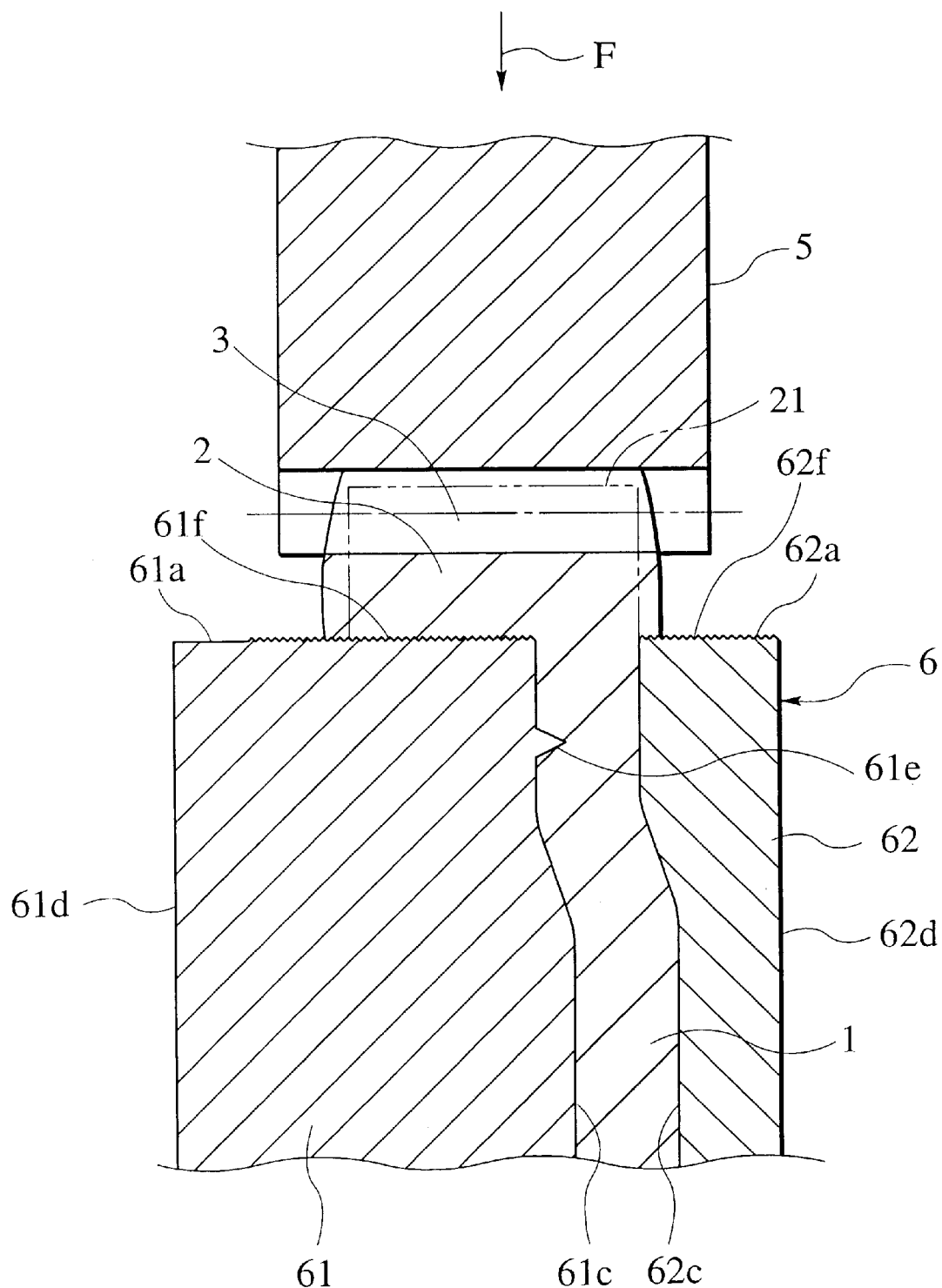
FIG. 7 is a sectional view of an essential portion of a drive plate gear and a process for producing the gear as a fourth embodiment of the invention.
Figure 8:
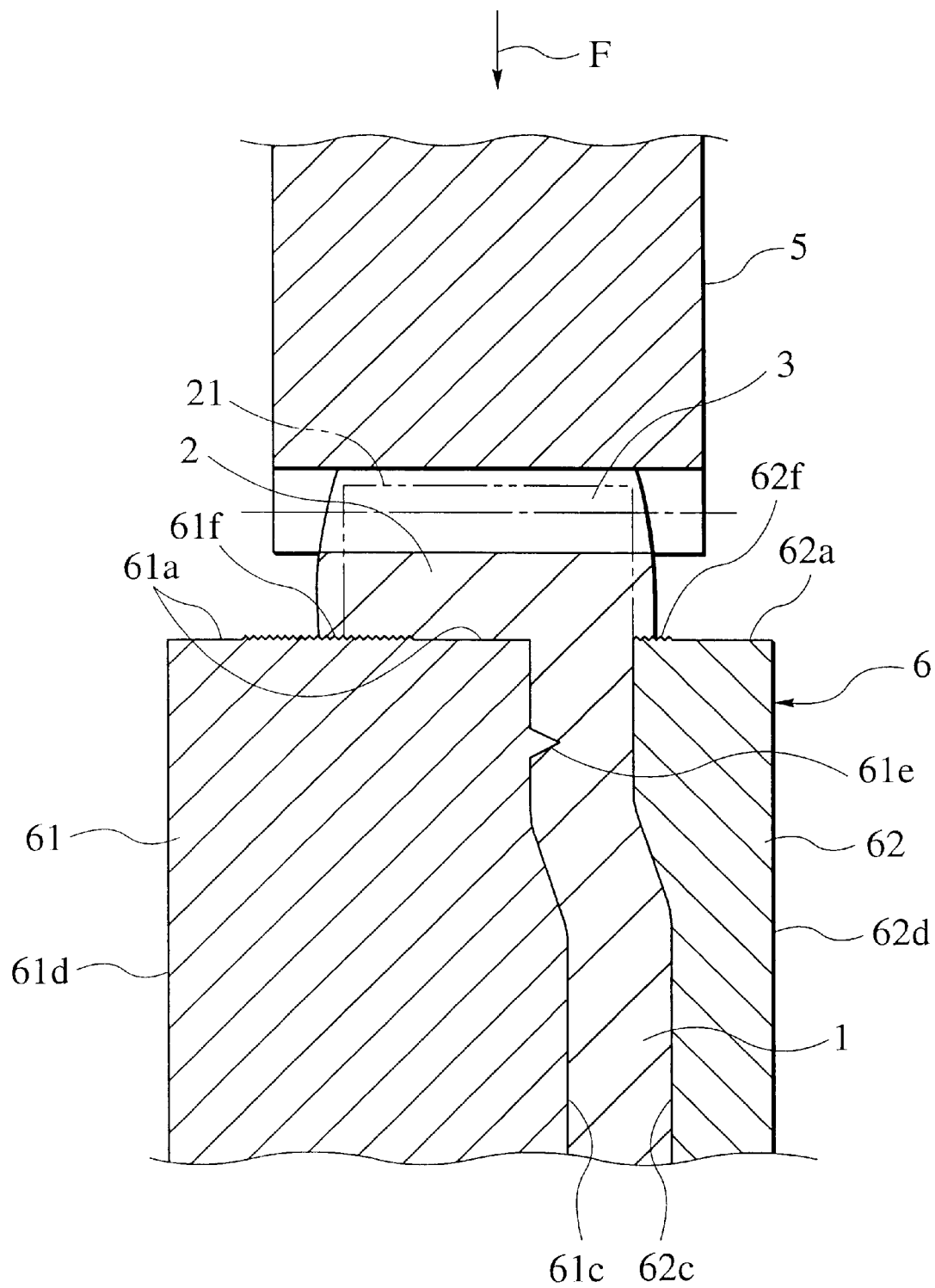
FIG. 8 is a sectional view of an essential portion of a drive plate gear and a process for producing the gear as a fifth embodiment of the invention.
Figure 9:
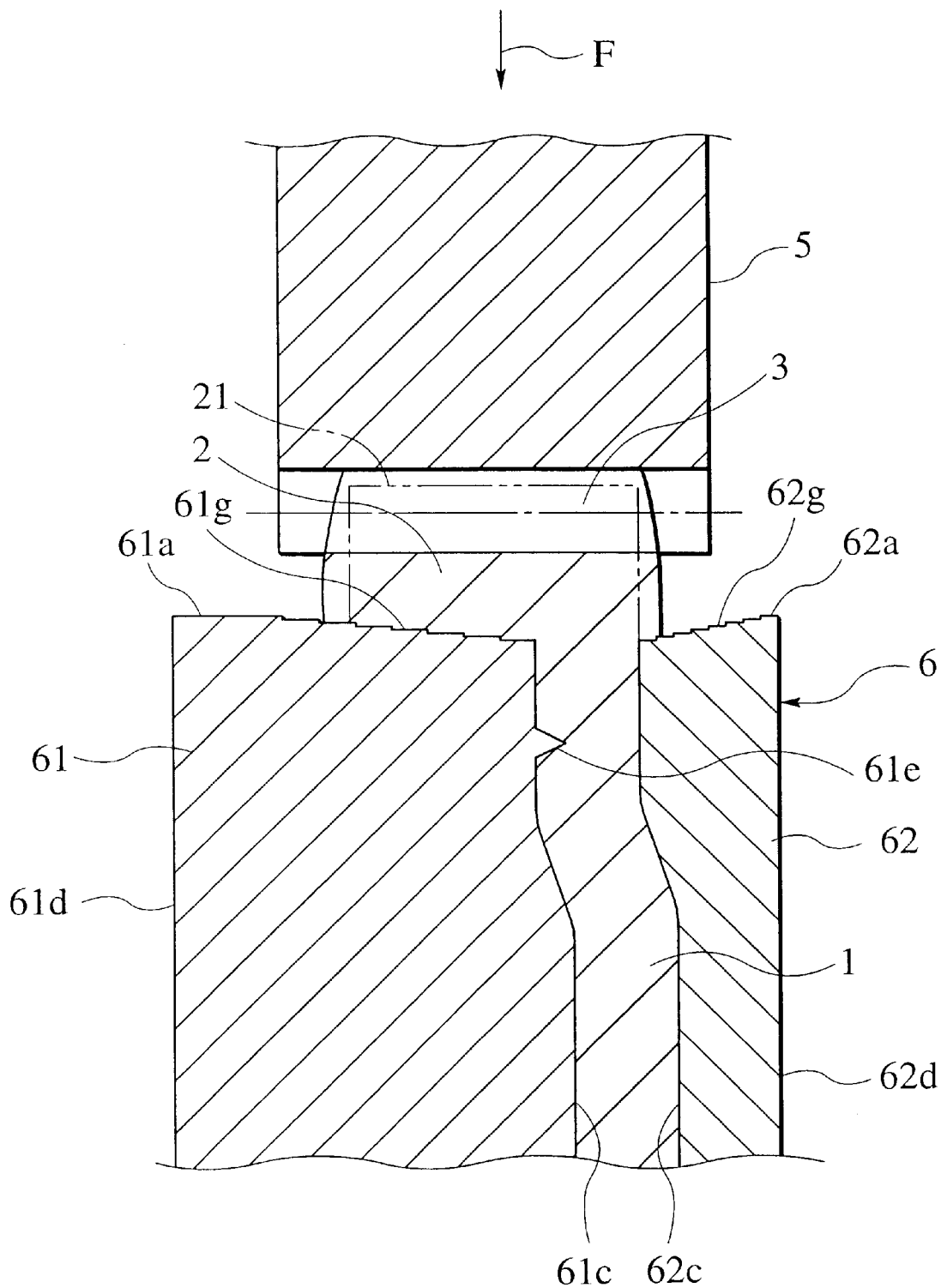
FIG. 9 is a sectional view of an essential portion of a drive plate gear and a process for producing the gear as a sixth embodiment of the invention.
Figure 10:
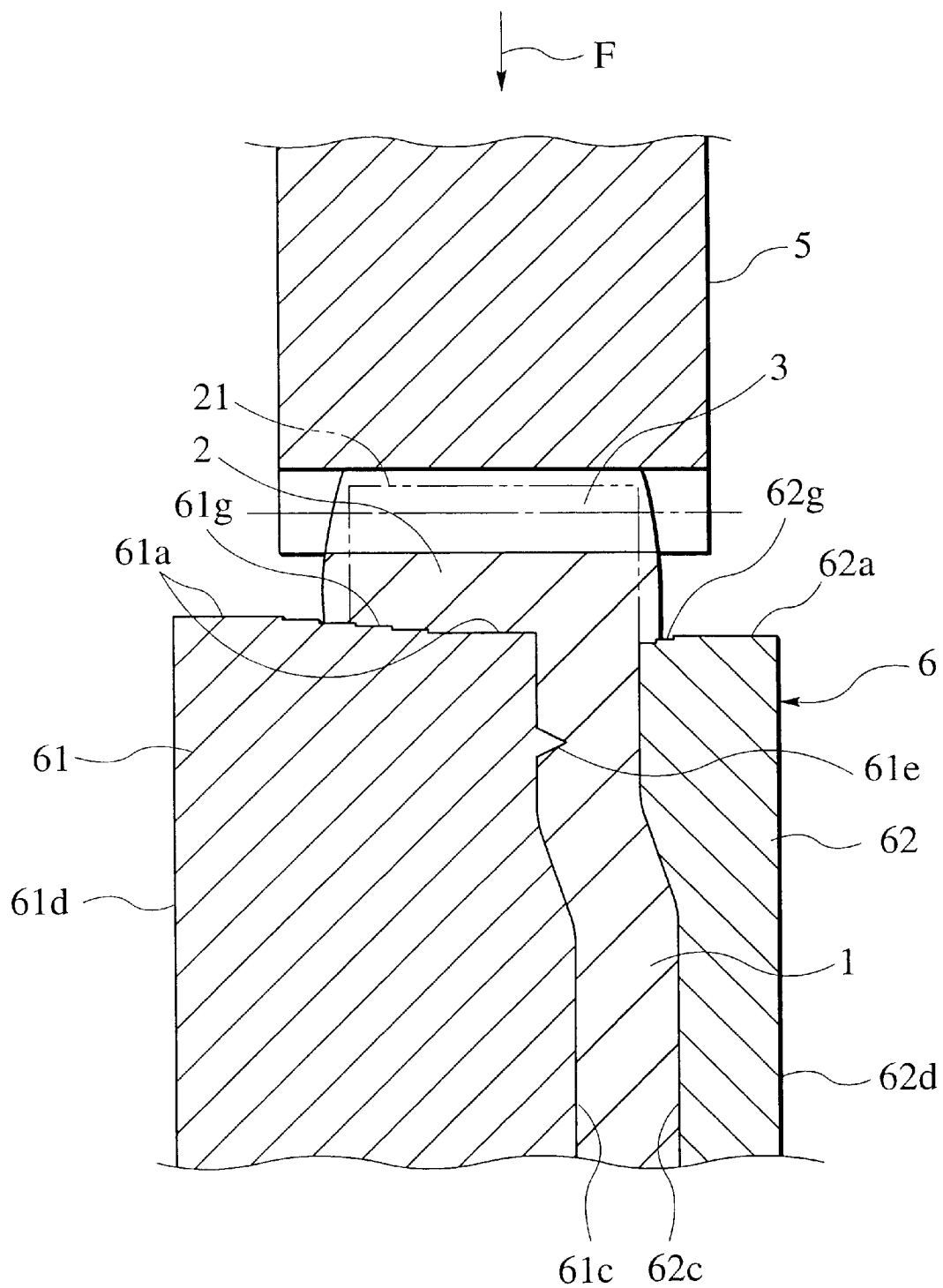
FIG. 10 is a sectional view of an essential portion of a drive plate gear and a process for producing the gear as a seventh embodiment of the invention.

Modes for carrying out the present invention will be described below based on embodiments and by reference to FIGS. 1 to 18. FIGS. 1 to 4 show a first embodiment, FIG. 5 shows a second embodiment, FIG. 6 shows a third embodiment, FIG. 7 shows a fourth embodiment, FIG. 8 shows a fifth embodiment, FIG. 9 shows a sixth embodiment, FIG. 10 shows a seventh embodiment, and FIGS. 11 to 18 show an eighth embodiment.

First, the first embodiment will be described by reference to FIGS. 1 to 4. A structure of a drive plate gear will be described while showing a process for producing the gear.

Figure 2:
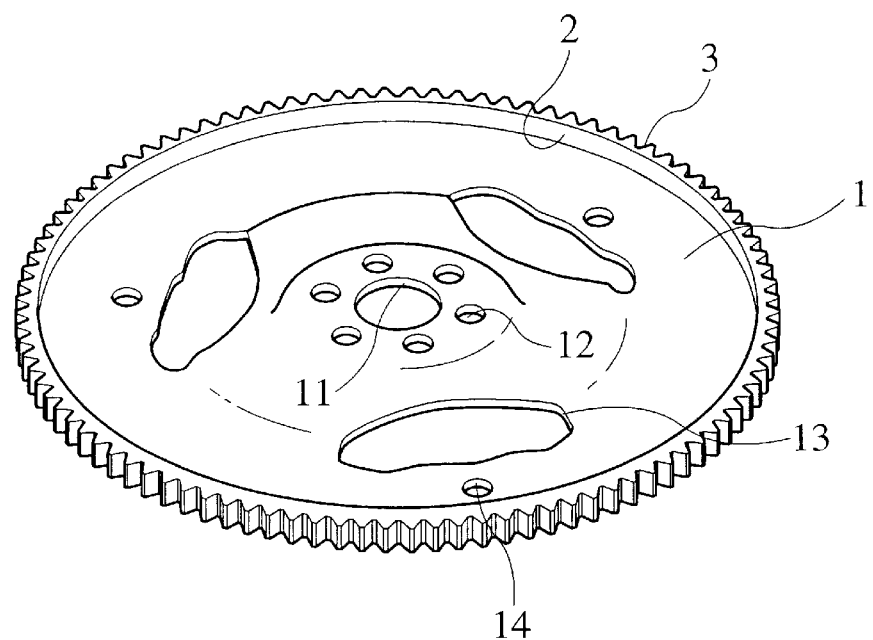
FIG. 2 is a perspective view of the drive plate gear.
Figure 3:
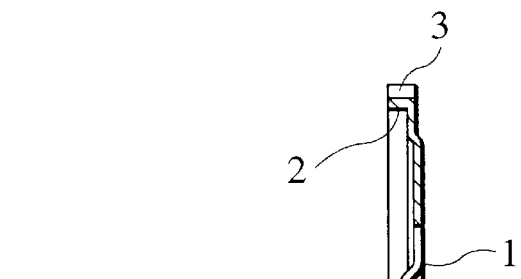
FIG. 3 is a sectional view of the drive plate gear.

The drive plate gear shown in the first embodiment is integrally formed of an arm 1, a rim 2, and cogs 3 as shown in FIGS. 2 and 3. The arm 1 is formed into a disc shape and formed with through holes 11 and 12 for connection with a crankshaft side of an engine, lightening holes 13, and through holes 14 for connection with a transmission side respectively at equal distance in a radial direction from an axial center and respectively at equal intervals in a circumferential direction. The arm 1 is molded by bending such that the arm 1 is symmetric about the axial center as a symmetry axis of rotation.

The rim 2 is formed by increasing a thickness of an outer periphery portion of material formed into the disk shape in the axial direction by heading (cold working), for example, and is in a cylindrical shape (annular shape) having a predetermined thickness in the axial direction. In FIG. 4, a portion shown by a chain double-dashed line and provided with a reference numeral 21 shows a shape of a thick portion corresponding to the rim 2 after heading. The cog 3 constitutes each cog of the gear and is molded by component rolling or thread rolling (cold working) by using a molding tool 5 on an outer peripheral surface of the rim 2 restrained by a molding support die 4 as shown in FIG. 4.

The molding support die 4 retains the arm 1 from opposite sides with a first molding support die 41 and a second molding support die 42 and restrains an inner peripheral surface and opposite axial end surfaces of the rim 2 with a restraining recessed portion 4a formed at a portion where the first molding support die 41 and the second molding support die 42 face each other. By molding the cog 3 by the molding tool 5 by component rolling while restraining the rim 2 by the restraining recessed portion 4a, material pressed in component rolling is prevented from escaping outward (to an end surface side of the rim 2).

In other words, because the material escapes only slightly, the accurate cog 3 that matches with the molding tool 5 can be molded without providing much extra material to the rim 2. A portion of the rim 2 protruding from the restraining recessed portion 4a is removed by cutting or the like.

In this case, because material protruding from the restraining recessed portion 4a remains between an outer peripheral surface 4b of the molding support die 4 and an outer peripheral surface of the molding tool 5, force F of pushing the molding tool 5 against the rim 2 in component rolling increases suddenly and increase in the force F disadvantageously damages the molding tool 5 and the molding support die 4.

Figure 1:
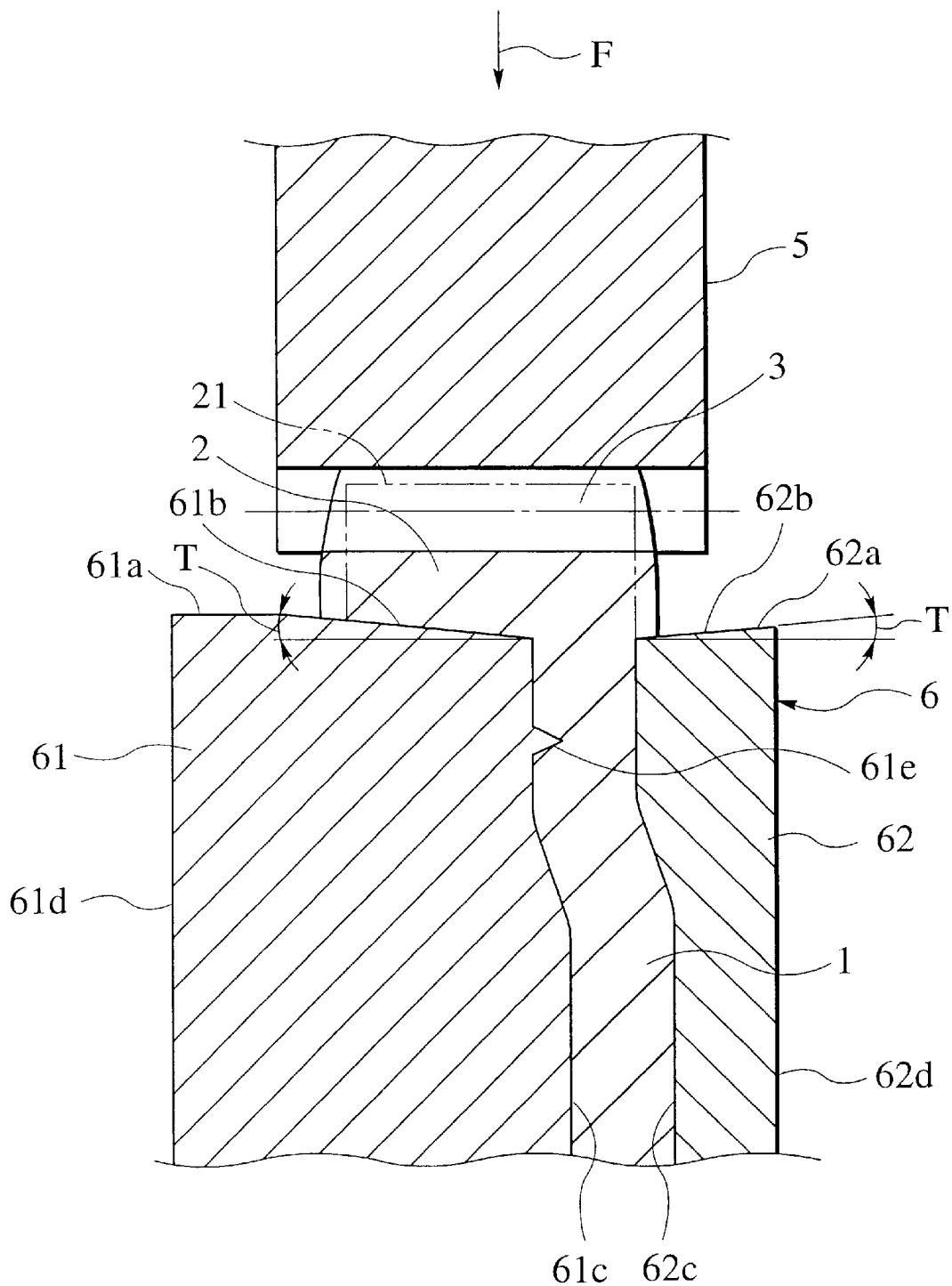
FIG. 1 is a sectional view of an essential portion showing a drive plate gear and a process for producing the gear as a first embodiment of the present invention.

Therefore, the drive plate gear shown in this embodiment has the rim 2 formed into the annular shape at the outer periphery portion of the arm 1 and having the predetermined thickness in the axial direction and a plurality of cogs 3 molded by component rolling on the outer peripheral surface of the rim 2 as especially shown in FIG. 1. While the rim 2 is retained by the molding support die 6 having an inner periphery support surface 61a for supporting an inner peripheral surface of the rim 2 and having resistance means for providing resistance to a flow of the rim 2 in component rolling, the cogs 3 are molded by component rolling on the rim 2 from the outer peripheral surface side of the rim 2.

The resistance means is formed on the inner periphery support surface 61a and formed of a sloped surface 61b that is sloped to approach an outside in a radial direction (an outer periphery side) as it extends toward an end surface side in the axial direction of the rim 2 (as it extends away from the arm 1). An inclination, i.e., a taper angle (inclination angle) T of the sloped surface 61b is in a range of 2° to 10°.

The material of the drive plate gear is formed into the disk shape having a thickness corresponding to the thickness of the above arm 1 and is steel for a gear including C: 0.32 to 0.38%, Si: 0.1% or less, Mn: 0.60 to 0.90%, P: 0.03% or less, S: 0.035% or less, and the balance of Fe (iron) and unavoidable impurity, by weight, where components except for Si corresponds to S35C material in JIS.

The above structure will be described below in further detail. The rim 2 is formed into a substantially cylindrical shape and a sectional shape of a thick portion 21 after heading and before forming of the cogs 3 is formed into a rectangular 25 shape to project to one side with respect to the arm 1. An inner surface of the rim 2 is preferably tapered by heading or the like so as to match with the taper angle T of the sloped surface 61b formed on the inner periphery support surface 61a.

The molding support die 6 is formed from the first molding support die 61 and the second molding support die 62. The first molding support die 61 actually supports the inner peripheral surface of the rim 2 with the sloped surface 61b on the inner periphery support surface 61a and this sloped surface 61b functions as the resistance means as described above. The sloped surface 61b has a shape of a side surface of a frustum and is formed over a wide range of the inner periphery support surface 61a extending from an inner side surface 61c to an outer side surface 61d of the first molding support die 61 such that the sloped surface 61b can sufficiently retain extra material that has protruded to the end surface sides of the rim 2 due to component rolling, not to mention the entire inner peripheral surface of the rim 2 at the beginning of molding of the cogs 3 by component rolling.

On the other hand, the sloped surface 62b of the second molding support die 62 is also in a shape of the side surface of the frustum. Although the sloped surface 62b does not retain the inner peripheral surface of the rim 2 at the beginning of molding of the cogs 3 by component rolling, the sloped surface 62b is formed in such a range as to sufficiently support the extra material generated in component rolling. In a case of this embodiment, an entire Inner periphery support surface 62a, i.e., an entire area of the inner periphery support surface 62a extending from an inner side surface 62c to an outer side surface 62d is the sloped surface 62b. When the rim 2 is projecting to opposite sides with respect to the arm 1, the sloped surface 62b provided to the inner periphery support surface 62a supports the inner peripheral surface of the rim 2 from the beginning of the component rolling.

The first molding support die 61 is provided at the inner side surface 61c for supporting the arm 1 with projections 61e. The plurality of projections 61e are formed into conical shapes at equal radial distance from an axial center (not shown) of the first molding support die 61 and at equal intervals in a circumferential direction. Although a size of each the projection 61e is exaggerated in the drawings, the plurality of small projections 61e which do not decrease strength of the arm 1 are actually provided.

Furthermore, the molding tool 5 is formed at an outer peripheral surface thereof with cogs for molding the cogs 3 by component rolling and each cog has a sufficient width such that the cog does not prevent the rim 2 from escaping to the end surface sides in the component rolling of the cog 3 and prevents the rim 2 from protruding.

In the drive plate gear formed in the above manner, the cogs 3 are molded by component rolling on the outer peripheral surface of the rim 2 while the inner peripheral surfaces of the rim 2 are supported by the inner periphery support surfaces 61a and 62a (the inner periphery support surface 62a does not support the inner peripheral surface at the beginning of the component rolling). Because the inner periphery support surfaces 61a and 62a are formed with the sloped surfaces 61b and 62b as the resistance means for providing resistance to the flow of the rim 2 in component rolling, it is possible to suppress escape of the rim 2 pressed in the component rolling to its one end surface side or its the other end surface side. In other words, because the resistance means are formed of the sloped surface 61b and 62b sloped to approach the outside in the radial direction as they extend away from the arm 1, escape of the rim to the respective end surface sides in the component rolling can be suppressed by reaction force from the sloped surfaces 61b and 62b.

Therefore, because the rim 2 escapes only slightly in the component rolling, the accurate cog 3 that matches with the molding tool 5 can be molded without providing much extra material to the rim 2. Because the resistance means have extremely simple structures including only the sloped surfaces 61b and 62b, it is possible to reduce cost as compared with the case of providing the restraining recessed portion 4a (see FIG. 4) in which the rim 2 is restrained in a recessed manner. Moreover, because a thickness of the one end portion of the rim 2 is decreased while a thickness of a base portion of the rim 2 on the arm 1 side that requires strength is increased by the sloped surface 61b, there is also an advantage f weight reduction while improving strength.

Furthermore, because the rim 2 is not restrained in the restraining recessed portion 4a (see FIG. 4), a large gap can be maintained between the outer peripheral surface of the molding tool 5 and the inner periphery support surfaces 61a and 62a (sloped surfaces 61b and 62b) of the molding support die 6. Therefore, even when the rim 2 escapes to the respective end surface sides in the component rolling, the material portion that has escaped is retained between the molding tool 5 and the molding support die 6 and the force F of pushing the molding tool 5 against the rim 2 does not increase. Thus, it is possible to increase life of the tools for component rolling such as the molding tool 5 and the molding support die 6. The material portion that has protruded from the end surface of the rim 2 is removed by cutting and the like.

Although the flow of the rim 2 in the component rolling can be suppressed by the sloped surfaces 61b and 62b, the flow of the rim 2 is not firmly restrained. Therefore, hardening and residual stress of material generated in the rim 2 can be suppressed or reduced. In other words, force of suppressing the flow of the rim 2 is determined by the taper angle T of the sloped surface 61b. Because the taper angle T is in a range of 2° to 10°, the flow of the rim 2 can be suppressed, and also because the taper angle T is set at such a value as not to firmly restrain the flow of the rim 2, hardening and residual stress of the rim 2 due to component rolling can be suppressed or reduced. Therefore, molding cracking of a bottom portion of the cog 3 molded by component rolling can be prevented and accuracy of the cog 3 can be improved.

Furthermore, when the component rolling is carried out by using the molding tool 5, a portion of the rim 2 pressed at this time presses the arm 1 and pushes the material out toward the rim 2 positioned on the opposite side across the axial center. However, because the projection 61e is provided to the inner side surface 61c of the first molding support die 61, the material pushed by the molding tool 5 can be prevented from entering the arm 1 and the material can be prevented from being pushed out from the arm 1 toward the opposite rim 2. Therefore, accuracy of the gear as a group of the respective cogs 3 can be improved.

Because the components of the material of the drive plate gear substantially correspond to the S35C material in JIS and include 0.1% or less of Si, when cold working is applied to increase the axial thickness of the peripheral edge portion of the arm 1 formed into the disc shape, increase in hardness of the rim 2 as the thick portion 21 is small as compared with that in the S35C material and elongation of the rim 2 can be also improved. Therefore, cracking of the end portions of the cog 3 in the cog width direction in molding of the cog 3 on the rim 2 can be prevented and life of the molding tool 5 as the gear molding tool can be increased. Moreover, because a yield point rises by setting Si at 0.1% or less, durability of the arm can be increased.

By using the steel for the gear including the components of the present application, durability of the arm 1 (a plate portion between the rim and the through holes 11 and 12 for connection with the crankshaft side) can be improved.

Incidentally, when a peripheral edge portion of the disc having a thickness of 2.6 mm is applied with cold working to obtain an axial thickness of 12 mm and a radial thickness of 7 mm, hardness increases from HRB74 to HRB108 in a case of the S35C material while hardness increases only to HRB102 in a case of the steel for the gear (Si: 0.1%) of the present embodiment. Elongation decreases from 38% to 15% in the case of the S35C material while elongation decreases only to 19% in the case of the steel for the gear of the embodiment.

A projection similar to the above-described projection 61e is preferable provided to the inner side surface 62c of the second molding support die 62, though it is not shown in the drawings. However, the projection is preferably provided to such a position as not to align with the projection 61e in the radial and circumferential directions to prevent decrease in strength of the arm 1. The through holes 11, 12, and 14 and the lightening hole 13 are preferably formed after molding of the cogs 3 by the component rolling so as to improve accuracy of shapes and positions of them.

Next, a second embodiment of the invention will be described by reference to FIG. 5. However, elements common to the first and second embodiments are provided with the same reference numerals or characters to simplify description of them. The second embodiment is different from the first embodiment in that a plurality of projecting portions 61f and 62f are provided to the respective sloped surfaces 61b and 62b.

In other words, the projecting portions 61f and 62f have triangular shapes in section and are formed on the respective sloped surfaces 61b and 62b to be adjacent to each other. As a result, the sloped surface 61b is repeatedly formed with projections and depressions by the projecting portions 61f.

The projecting portions 61f are formed on the sloped surface 61b throughout a circumference and have heights which are equal to or less than heights for knocking out the drive plate gear from the first molding support die 61 (molding support die 6) after molding the cogs 3 by component rolling and are equal to or greater than heights for providing resistance to the flow of the rim 2. The projecting portions 62f are formed similarly to the above projecting portions 61f.

Because the resistance means are formed of the projecting portions 61f and 62f formed on the inner periphery support surfaces 61a and 62a in the drive plate gear with the above structure, a degree of suppressing of the flow of the rim 2 can be changed by changing size such as heights and the number of the projecting portions 61f and 62f.

Because the respective projecting portions 61f and 62f are formed throughout the circumferences on the respective sloped surfaces 61b and 62b, the flow of the rim 2 to the end surface sides (in such directions as to move away from the arm 1) can be uniformly suppressed in the circumferential direction.

Furthermore, because both the sloped surfaces 61b and 62b and the projecting portions 61f and 62f are provided as the resistance means, an effect for suppressing the flow of the rim 2 is further enhanced by a synergistic effect between them. Because the projecting portions 61f and 62f are formed on the sloped surfaces 61b and 62b, it is possible to easily knock the drive plate gear out of the first molding support die 61 and the second molding support die 62 with small force even when heights of the respective projecting portions 61f and 62f are increased. In addition to the above effects, the second embodiment exhibits operations and effects similar to those of the first embodiment.

Although the projecting portions 61f and 62f are formed to be adjacent to each other in the above second embodiment, they may be formed at predetermined intervals. The recessed portions may be provided at predetermined intervals. This case is the same as the case in which the projecting portions having great widths are provided to be adjacent to each other.

Next, a third embodiment of the invention will be described by reference to FIG. 6. However, elements common to the second and third embodiments are provided with the same reference numerals or characters to simplify description of them. The third embodiment is different from the second embodiment in that the sloped surfaces 61b and 62b and the projecting portions 61f and 62f are provided only to positions in the vicinity of the end surfaces of the rim 2.

In other words, the inner periphery support surface 61a of the first molding support die 61 is not provided on the arm 1 side with the sloped surface 61b and the projecting portions 61f as the resistance means. A portion of the inner periphery support surface 62a of the second molding support die 62 at a distance from the arm 1, i.e., the portion on the outer side surface 62d side is not provided with the sloped surface 62b and the projecting portions 62f. The respective projecting portions 61f and 62f are provided only to the sloped surfaces 61b and 62b.

Because the sloped surfaces 61b and 62b and the projecting portions 61f and 62f are provided to the positions in the vicinity of the end surfaces of the rim 2 in the drive plate gear with the above structure, material flows smoothly at portions other than the vicinity of the end surfaces of the rim 2. Therefore, it is possible to reduce pressure required for the component rolling, to increase life of jigs and tools such as the molding tool 5 and the molding support die 6, and to save energy. In addition to the above effects, the third embodiment exhibits operations and effects similar to those of the second embodiment.

Although the resistance means are formed of the sloped surfaces 61b and 62b and the projecting portions 61f and 62f provided on the sloped surfaces 61b and 62b in the above third embodiment, the resistance means may be formed only of the sloped surfaces 61b and 62b without providing the projecting portions 61f and 62f.

Next, a fourth embodiment of the invention will be described by reference to FIG. 7. However, elements common to the second and fourth embodiments are provided with the same reference numerals or characters to simplify description of them. The fourth embodiment is different from the second embodiment in that only the plurality of projecting portions 61f and 62f are provided without providing the sloped surfaces 61b and 62b (see FIG. 5).

In other words, although the projecting portions 61f and 62f are provided similarly to the second embodiment, positions where they are provided are the Inner periphery support surfaces 61a and 62a having a cylindrical surface shape.

Because the projecting portions 61f and 62f are provided on the inner periphery support surfaces 61a and 62a having the cylindrical surface shape in the drive plate gear with the above structure, knocking out of the drive plate gear is difficult as compared with the second embodiment. Therefore, it is necessary to decrease heights of the projecting portions 61f and 62f as compared with the second embodiment. Other operations and effects are similar to those of the second embodiment.

Next, a fifth embodiment of the invention will be described by reference to FIG. 8. However, elements common to the third and fifth embodiments are provided with the same reference numerals or characters to simplify description of them. The fifth embodiment is different from the third embodiment in that only the plurality of projecting portions 61f and 62f are provided without providing the sloped surfaces 61b and 62b (see FIG. 6).

In other words, although the projecting portions 61f and 62f are provided similarly to the third embodiment, positions where they are provided are only portions on the inner periphery support surfaces 61a and 62a having the cylindrical surface shape corresponding to the respective end surfaces of the rim 2.

Because the projecting portions 61f and 62f are provided on the inner periphery support surfaces 61a and 62a having the cylindrical surface shape in the drive plate gear with the above structure, knocking out of the drive plate gear is difficult as compared with the third embodiment. Therefore, it is necessary to decrease heights of the projecting portions 61f and 6 2f as compared with the third embodiment. Other operations and effects are similar to those of the third embodiment.

Next, a sixth embodiment of the invention will be described by reference to FIG. 9. However, elements common to the first and sixth embodiments are provided with the same reference numerals or characters to simplify description of them. The sixth embodiment is different from the first embodiment in that stepped portions 61g and 62g are provided instead of the sloped surfaces 61b and 62b (see FIG. 1).

In other words, in the positions of the sloped surfaces 61b and 62b shown in the first embodiment, the plurality of stepped portions 61g and 62g formed in stair shapes are formed to approach an outside in a radial direction as they extend away from the arm 1. A top surface of each of the stepped portions 61g and 62g is formed throughout the circumference of the inner periphery support surface 61a or 62a to have a cylindrical surface shape.

Because the stepped portions 61g and 62g are formed in the stair shapes to approach the outside in the radial direction as they extend away from the arm 1 in the drive plate gear with the above structure, the flow of the rim 2 toward the end surfaces in the component rolling can be suppressed. Because the stepped portions 61g and 62g do not provide resistance in knocking the drive plate gear out of the molding support die 6, the drive plate gear can be easily knocked out. Moreover, a degree of suppressing of the flow of the rim 2 can be freely changed by changing heights of the respective stepped portions 61g and 62g. In addition to the above effects, the sixth embodiment exhibits operations and effects similar to those of the first embodiment.

Although the top surface of each of the stepped portions 61g and 62g is formed in the cylindrical surface shape in the sixth embodiment, the projecting portion 61f or 62f as shown in the second embodiment may be provided to the top surface, for example.

Next, a seventh embodiment of the invention will be described by reference to FIG. 10. However, elements common to the sixth and seventh embodiments are provided with the same reference numerals or characters to simplify description of them. The seventh embodiment is different from the sixth embodiment in that the stepped portions 61g and 62g are provided only to the positions in the vicinity of the end surfaces of the rim 2.

In other words, the inner periphery support surface 61a of the first molding support die 61 is not provided on the arm 1 side with the stepped portion 61g as the resistance means. A portion of the inner periphery support surface 62a of the second molding support die 62 at a distance from the arm 1, i.e., the portion on the outer side surface 62d side is not provided with the stepped portion 62g.

Because the stepped portions 61g and 62g are provided to the positions in the vicinity of the end surfaces of the rim 2 in the drive plate gear with the above structure, material flows smoothly at portions other than the vicinity of the end surfaces of the rim 2. Therefore, it is possible to reduce pressure required for the component rolling, to increase life of the component rolling tool such as the molding tool 5 and the molding support die 6, and to save energy. In addition to the above effects, the seventh embodiment exhibits operations and effects similar to those of the sixth embodiment. A single stepped portion 61g can exhibit similar operations and effects by adjusting a height of it.

Although the resistance means are provided to both the first molding support die 61 and the second molding support die 62 in the above respective embodiments, the resistance means may be provided only to the first molding support die 61 for supporting the inner peripheral surface of the rim 2. In this case, the inner periphery support surface 62a of the second molding support die 62 is formed to be higher than the inner periphery support surface 61a of the first molding support die 61.

Figure 11:
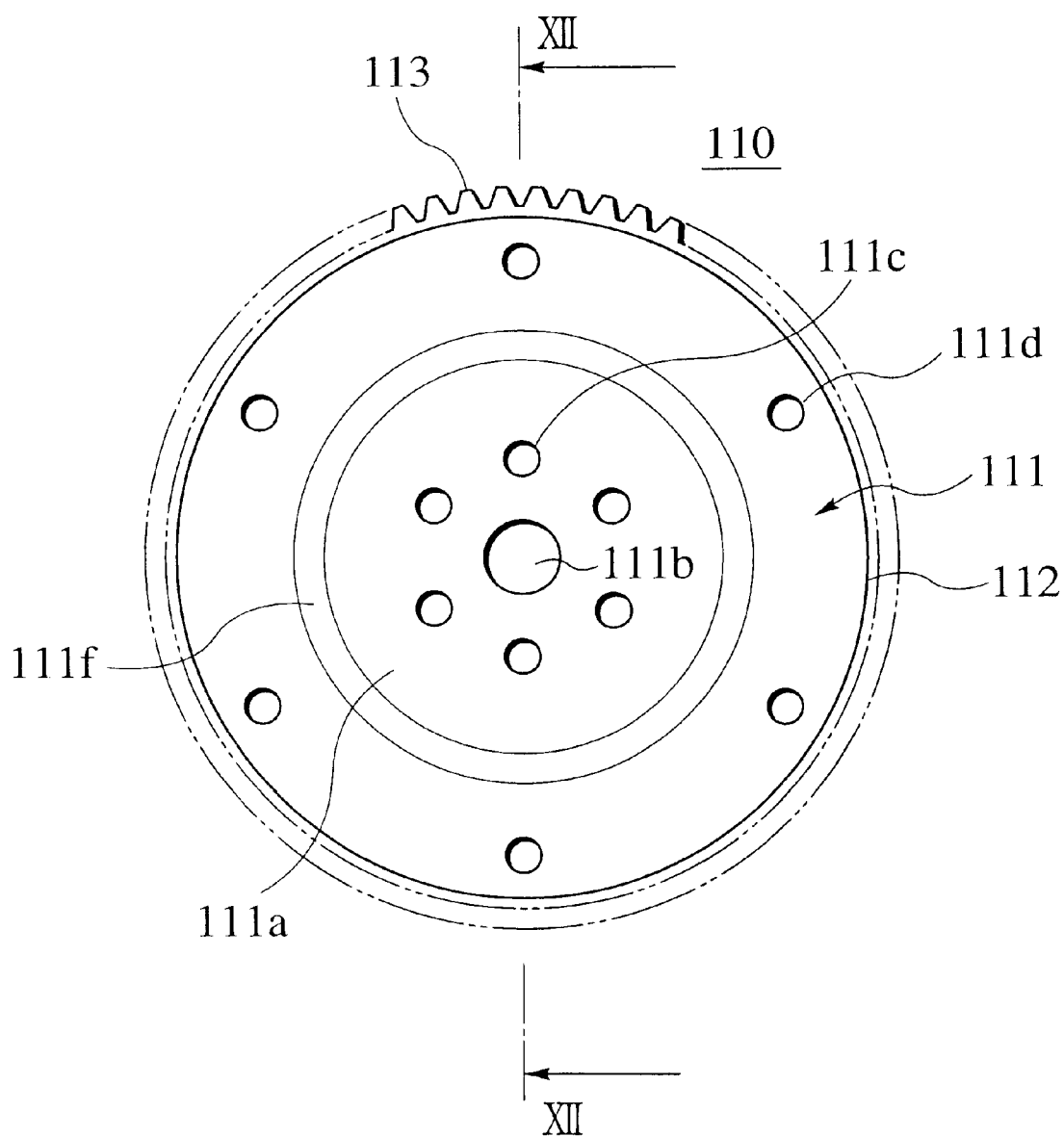
FIG. 11 is a front explanatory view of a drive plate gear as an eighth embodiment of the invention.
Figure 12:
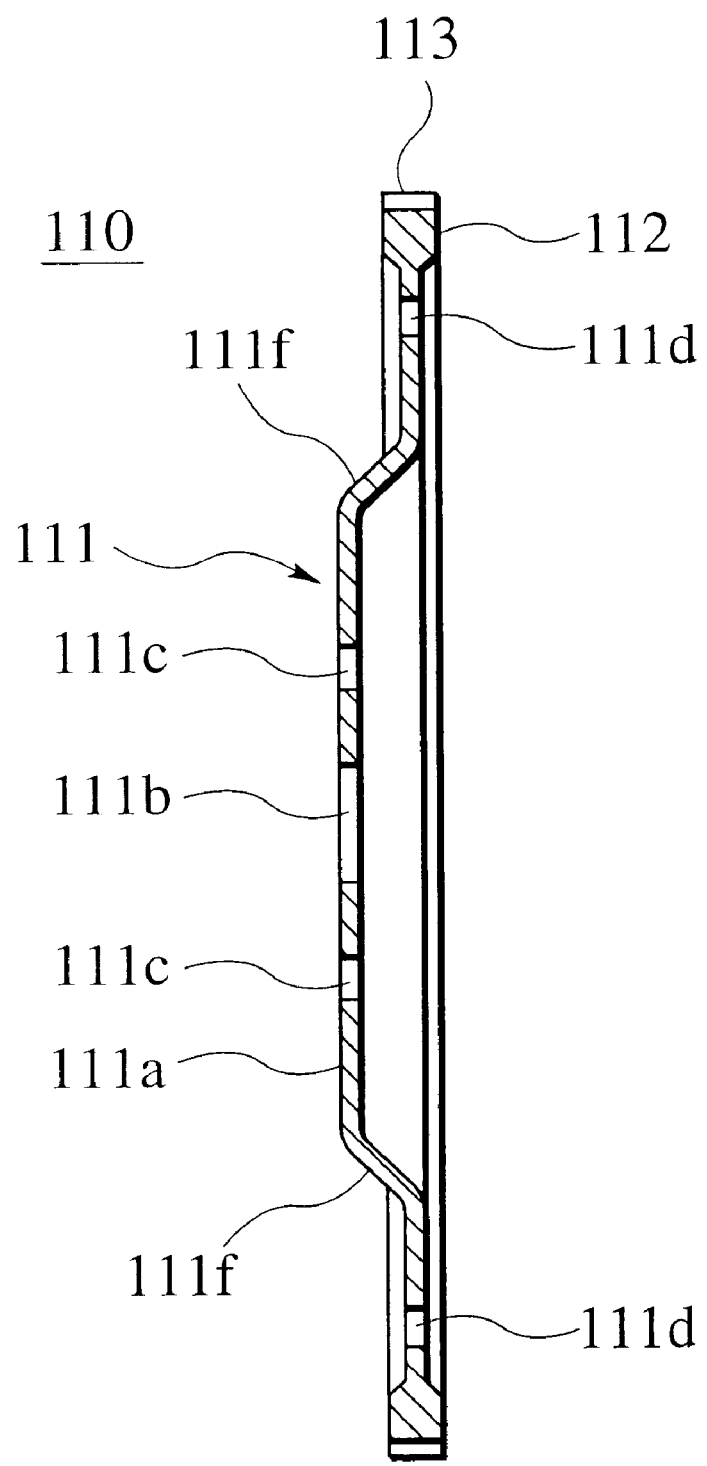
FIG. 12 shows the drive plate gear and is an explanatory view taken in a direction of an arrow XII—XII in FIG. 11.

Next, an eighth embodiment of the invention will be described by reference to FIGS. 11 to 18. Material of the drive plate gear including the same components as the steel for the gear shown in the first embodiment is used. FIG. 11 is a front explanatory view of the drive plate gear, FIG. 12 is a sectional explanatory view taken in a direction of an arrow XII—XII in FIG. 11, and FIG. 13 is a sectional explanatory view showing a state of use of the drive plate gear.

Figure 13:
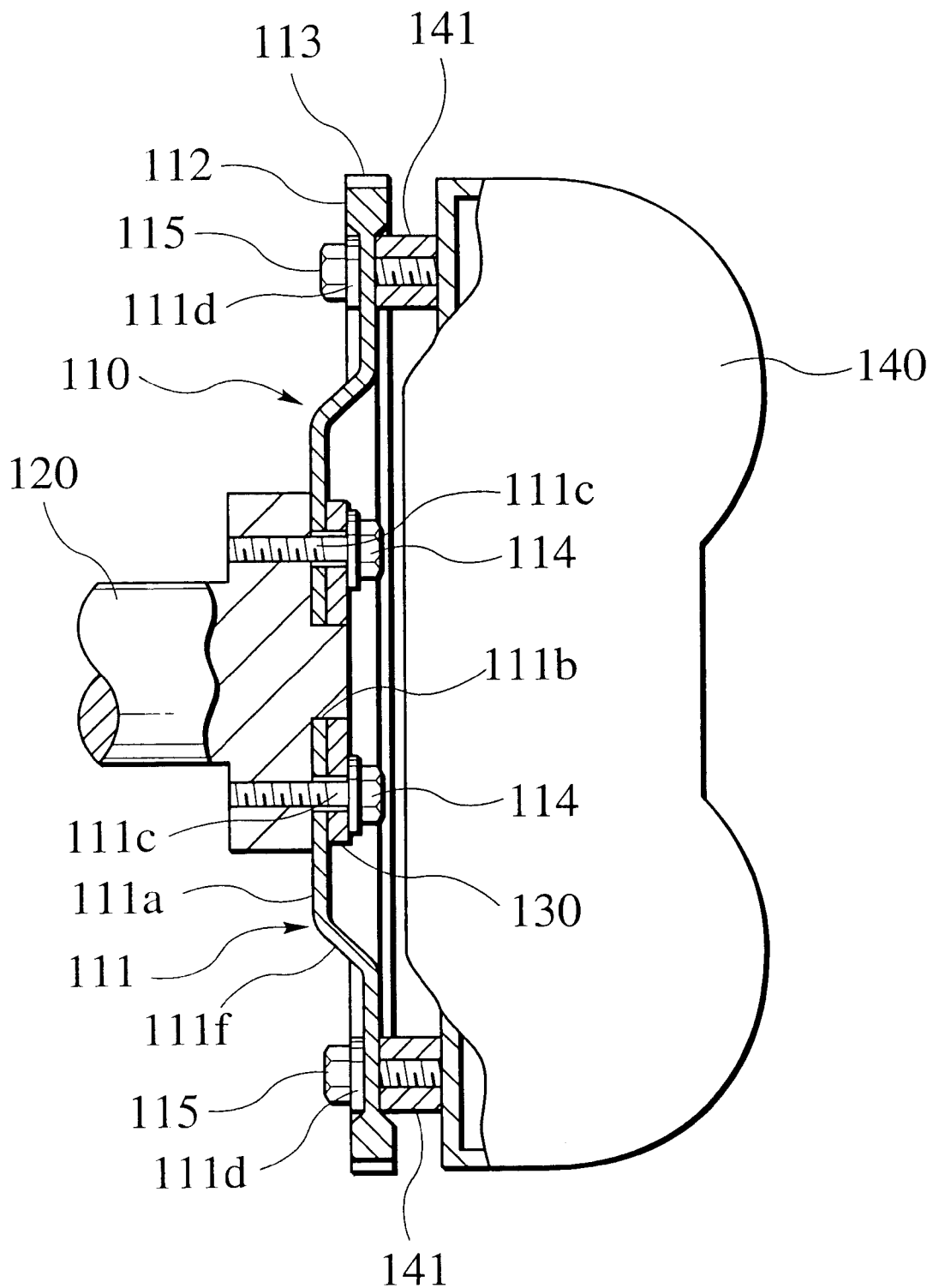
FIG. 13 is a sectional explanatory view showing a state of use of the drive plate gear.

As is clear from FIG. 13, the drive plate gear 110 according to the eighth embodiment has at its center portion a mounting portion 111a for mounting the drive plate gear 110 to the crankshaft 120 of the engine and at its outer peripheral edge a cylindrical portion (rim) 112 formed with cogs 113. An intermediate portion between the cylindrical portion 112 and the mounting portion 111a is formed to be thin so as to absorb vibration of a torque converter 140 mounted to the drive plate gear 110. The cylindrical portion 112 is formed at an outer peripheral edge of the intermediate portion.

The above-described drive plate gear 110 is molded of a thin metal plate, i.e., material in a plate shape and made of the above steel for the gear and formed of a disc portion 111, the cylindrical portion 112 formed to be thick by increasing thickness of an outer peripheral surface of the disc portion 111 and having the same axis as the disc portion 111, and the cogs 113 formed on an outer peripheral surface of the cylindrical portion 112 by component rolling (cold working).

Next, a structure of the invention will be described in further detail.

At a center portion of the disc portion 111, the mounting portion 111a is formed in a cylindrical shape having a bottom and projecting toward the crankshaft 120 of the engine. A periphery 111f of the mounting portion 111a is tapered as shown in FIGS. 12 and 13. A through hole 111b is formed at a center portion of the mounting portion 111a and a plurality of bolt mounting holes 111c are formed on an outside of and in the vicinity of the through hole 111b at predetermined intervals on the same circumference. The drive plate gear 110 is fixed to an end portion of the crankshaft 120 through a reinforce plate 130 by mounting bolts 114 inserted through the bolt mounting holes 111c.

On an outer periphery side of the disc 11, i.e. on a thin portion inside the thick cylindrical portion 112, mounting portions 111d for mounting the torque converter 140 to the drive plate gear 110 are formed. The plurality of mounting portions 111d are formed at predetermined intervals on the same circumference and bosses 141 are fixed to a side surface of the torque converter 140 to face the mounting portions 111d by welding or the like. By screwing mounting bolts 115 inserted through the mounting portions 111d down into the bosses 141, the drive plate gear 110 is fixed to the torque converter 140. Although the mounting portion 111a in the cylindrical shape having the bottom and projecting toward the crankshaft 120 of the engine is formed at the center portion of the disc portion 111 in the above embodiment, the invention is not limited to it, but the drive plate gear 110 may be reversed and fixed to the torque converter 140.

As described above, because the intermediate portion between the thick cylindrical portion 112 and the mounting portion 111a is formed to be thin so as to absorb vibration of the torque converter 140 mounted to the drive plate gear 110, the drive plate gear 110 has flexibility, i.e., such a characteristic as to be resiliently deformed to a sufficient degree within allowable stress, sufficiently absorbs vibration of the torque converter 140 to prevent the vibration from being transmitted to the engine side, and can be reduced in weight.

Because the mounting portions 111d for mounting the torque converter 140 to the drive plate gear 110 is formed on the thin portion inside the cylindrical portion 112 in this embodiment, vibration of the torque converter 140 can be absorbed further effectively.

The mounting portion 111a for mounting the drive plate gear 110 to the crankshaft 120 is formed to project in the cylindrical shape having the bottom and the periphery 111f of the mounting portion 111a is tapered in this embodiment, stress caused by vibration of the torque converter 140 is relaxed by the tapered portion formed at the periphery 111f of the mounting portion 111a to prevent the stress caused by vibration from directly acting on the mounting portion 111a for mounting the drive plate gear 110 to the crankshaft 120 like in a case of a flat drive plate gear. As a result, stiffness is increased as compared with the flat drive plate gear, and thus, a thickness of the drive plate can be further reduced. Flexibility between the mounting portion 111d for mounting the torque converter 140 to the drive plate gear 110 and the mounting portion 111a for mounting the drive plate gear 110 to the crankshaft 120 can be increased as compared with the flat drive plate gear, thereby reliably preventing transmission of vibration to the engine side.

The drive plate gear can be applied to a case of the crankshaft 120 and the torque converter 140 separated from each other in an axial direction by forming the tapered portion as described above, thereby increasing a degree of flexibility in design.

Because thicknesses of opposite end portions of the cylindrical portion 112 are increased by roller molding before molding the cogs 113 by component rolling in molding the above-described drive plate gear 110 in this embodiment, strength of the cogs 113 can be increased and the cogs 113 can be reliably engaged with a gear for an engine starter. Because a securing step such as welding that has been conducted conventionally is unnecessary, it is possible to significantly reduce producing cost.

By using the steel for the gear including the components of the present application, it is possible to improve durability of the plate portion between the thick cylindrical portion and the through holes 111c and 111b for connection with the crankshaft side.

Next, respective embodiments of a process for producing the drive plate gear according to the invention will be described.

FIGS. 14 to 18 are sectional explanatory views showing respective steps of die cutting, drawing, slitting, thickness increasing, and molding of cogs by component rolling by cold working according to the process for producing the drive plate gear.

Figure 14:
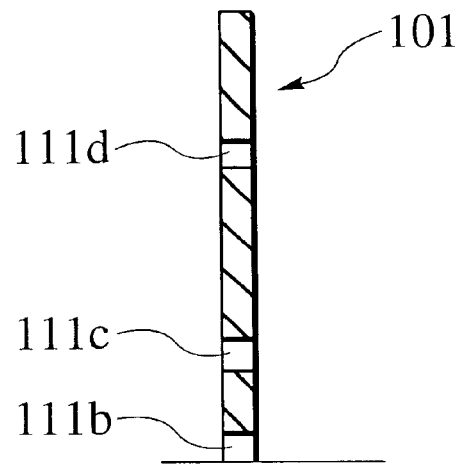
FIG. 14 is a sectional explanatory view showing respective steps of die cutting, drawing, slitting, thickness increasing, and molding of cogs by component rolling according to a process for producing the drive plate gear.
Figure 15:
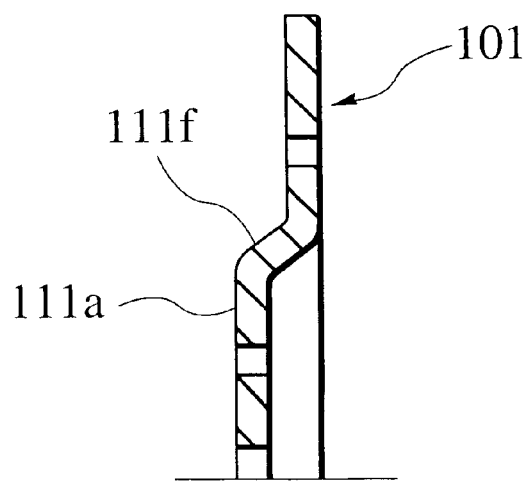
FIG. 15 is a sectional explanatory view showing respective steps of die cutting, drawing, slitting, thickness increasing, and molding of cogs by component rolling according to a process for producing the drive plate gear.
Figure 16:
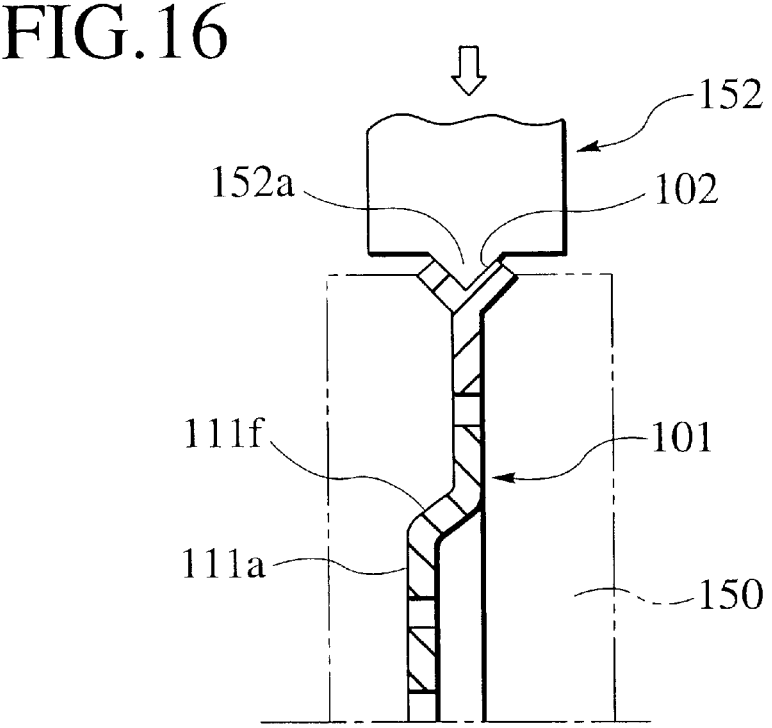
FIG. 16 is a sectional explanatory view showing respective steps of die cutting, drawing, slitting, thickness increasing, and molding of cogs by component rolling according to a process for producing the drive plate gear.
Figure 17:
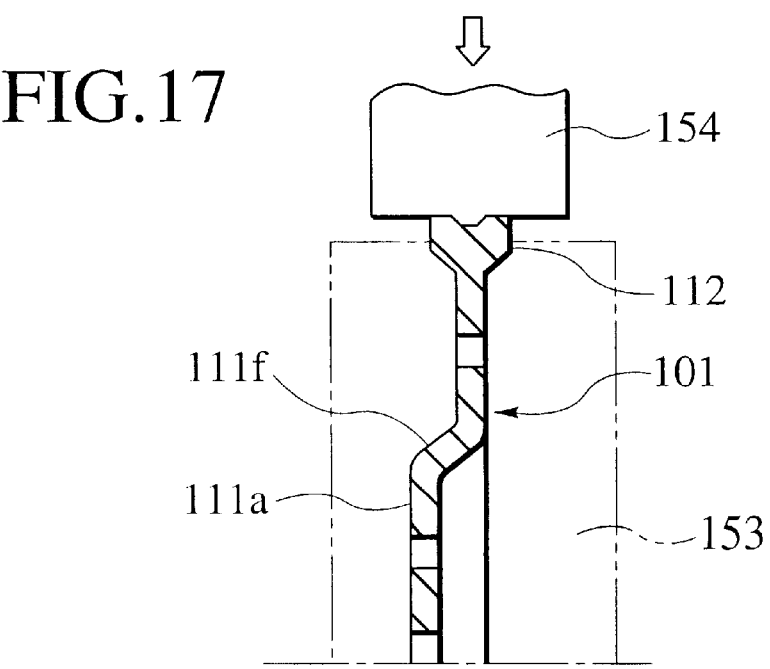
FIG. 17 is a sectional explanatory view showing respective steps of die cutting, drawing, slitting, thickness increasing, and molding of cogs by component rolling according to a process for producing the drive plate gear.

First, as shown in FIG. 14, thin plate-shaped material made of the above steel for the gear is die-cut to form disc-shaped material 101 having the through hole 111b, the bolt mounting holes 111c, and the mounting portions 111d at the center portion and the outer periphery side of the disc-shaped material 101 by using a pressing machine. Next, the center portion of the material 101 is applied with deep-drawing into a cylindrical shape by the pressing machine as shown in FIG. 15 to mold the mounting portion 111a and the tapered periphery 111f. Then, as shown in FIG. 16, the following component rolling is applied by using a slitting component rolling machine. In other words, the material 101 is cramped by a rotary pedestal 150, a tip end portion 152a of a slitting roller 152 as a first roller is brought into contact with an outer peripheral surface of the material 101, and the slitting roller 152 is pushed against the material 101 while synchronously rotating the rotary pedestal 150 and the slitting roller 152, thereby dividing the outer peripheral surface of the material 101 by slitting in a thickness direction to form a slit groove 102. Then, as shown in FIG. 17, the material 101 is cramped by a rotary pedestal 153 and a second roller 154 is pushed against the slit groove 102 formed in the preceding step to increase thicknesses of opposite end portions of the cylindrical portion 112. By pushing the roller 154 that rotates synchronously with the material 101 against the outer peripheral surface of the material 101 radially inward in this manner, the thicknesses of the opposite end portions of the outer periphery portion of the material 101 are increased to form the cylindrical portion 112.

Figure 18:
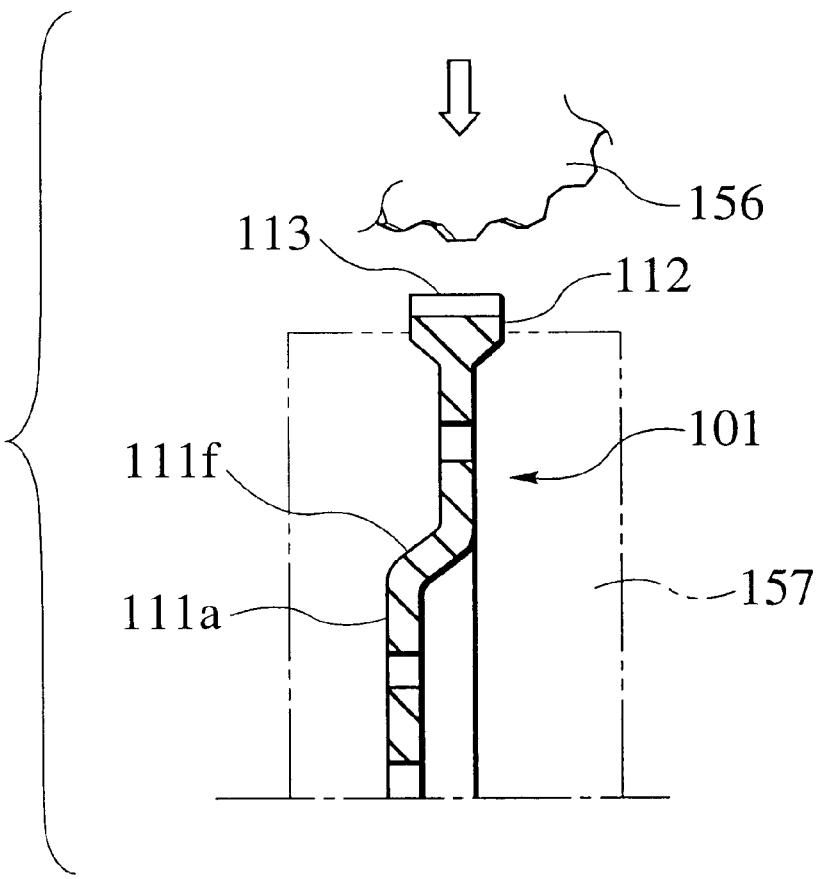
FIG. 18 is a sectional explanatory view showing respective steps of die cutting, drawing, slitting, thickness increasing, and molding of cogs by component rolling according to a process for producing the drive plate gear.

Furthermore, at a final molding step shown in FIG. 18, a molding roller 156 in a shape of cogs corresponding to a shape of a final product is pushed against the outer peripheral surface of the cylindrical portion 112 to mold the cogs 113 by component rolling.

At this component rolling step, the material 101 is cramped by a rotary pedestal 157 and rotates synchronously with the molding roller 156.

Thus, the drive plate gear 110 in a shape shown in FIGS. 11 and 12 is obtained.

Moreover, because increase of hardness is small and elongation is improved in the steel for the gear including the components of the present application, cracking of end portions of the cog in molding the gear on the thick portion can be prevented and life of the gear molding tool can be increased.

The entire contents of Japanese Patent Application P11-89918 (filed Mar. 30, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A steel for a gear, comprising:
   C: 0.32 to 0.38%;
   Si: 0.1% or less;
   Mn: 0.60 to 0.90%;
   P: 0.03% or less; and
   S: 0.035% or less.

2. A drive plate gear molded of the steel for the gear according to claim 1, comprising:
   an arm (1);
   a rim (2) formed in an annular shape on an outer periphery portion of then arm (1), the rim (2) having a predetermined thickness in an axial direction; and
   a plurality of cogs (3) molded on an outer peripheral surface of the rim (2) by component rolling,
      wherein the rim (2) is retained by a molding support die (6) which has an inner periphery support surface (61a) for supporting an inner peripheral surface of the rim (2) and which includes resistance means for providing resistance to a flow of the rim (2) in the component rolling; and the cogs (3) are molded on the rim (2) by the component rolling from an outer peripheral surface side while the rim (2) is retained by the molding support die (6).

3. A method for producing a drive plate gear molded of the steel for the gear according to claim 1, comprising the step of:

molding a plurality of cogs (3) by component rolling on an outer peripheral surface of a rim (2) which is formed in an annular shape on an outer periphery portion of an arm (1) and which has a predetermined thickness in an axial direction, wherein while the rim (2) is retained from an inner peripheral surface (61a) side by a molding support die (6) which has an inner periphery support surface (61a) for supporting an inner peripheral surface of the rim (2) and which includes resistance means for providing resistance to a flow of the rim (2) in the component rolling, the cogs (3) are molded on the outer peripheral surface of the rim (2) by the component rolling.

4. A drive plate gear molded of the steel for the gear according to claim 1, comprising:

a disc (111);

a mounting portion (111a) for mounting the drive plate gear to a crankshaft (120) of an engine at a center portion of the disc (111);

a mounting portion (111d) for mounting the drive plate gear to a torque converter (140) at an outer periphery portion of the disc (111); and a cylindrical portion (112) provided on an outer peripheral edge of the disc (111), the cylindrical portion (112) being formed with cogs (113), wherein an intermediate portion between the cylindrical portion (112) and the mounting portion (111a) for mounting the drive plate gear to the crankshaft (120) is formed to be thin so as to absorb vibration of the torque converter (140) mounted to the drive plate gear and has flexibility;

the cylindrical portion (112) is formed to be thick by increasing thicknesses of opposite end portions of the outer peripheral edge of the disc (111) made of the steel for the gear; and the cogs (113) are formed by component rolling on an outer peripheral surface of the thick cylindrical portion (112).

5. A method for producing a drive plate gear from a thin disc-shaped material made of the steel for the gear according to claim 1, comprising the steps of:

plastically processing to form a cylindrical portion (112) having the same axis as a disc portion at an outer peripheral edge portion of the disc portion; and molding cogs (113) by component rolling on an outer peripheral surface of the cylindrical portion (112), wherein a roller rotating synchronously with the disc-shaped material is pushed radially inward against an outer peripheral surface of the disc-shaped material to increase thicknesses of opposite end portions of an outer periphery portion of the disc-shaped material to form the thick cylindrical portion (112); and the cogs (113) are molded by the component rolling on the outer peripheral surface of the cylindrical portion (112) after forming the thick cylindrical portion (112).

\* \* \* \* \*